US006489386B1

(12) United States Patent
Plotzker et al.

(10) Patent No.: US 6,489,386 B1
(45) Date of Patent: Dec. 3, 2002

(54) METHOD AND COMPOSITION FOR IMPROVING GAS BARRIER PROPERTIES OF POLYMERIC CONTAINERS AND FILMS

(75) Inventors: Irene Greenwald Plotzker, Wilmington, DE (US); Thomas Michael Ford, Greenville, DE (US); Kenneth George Sharp, Landenberg, PA (US); Samuel Tacitus D'Arcangelis, Randolph, NJ (US)

(73) Assignee: E. I. du Pont de Nemours and Company, Wilmington, DE (US)

(*) Notice: Subject to any disclaimer, the term of this patent is extended or adjusted under 35 U.S.C. 154(b) by 0 days.

(21) Appl. No.: 09/634,288

(22) Filed: Aug. 9, 2000

Related U.S. Application Data

(60) Provisional application No. 60/148,537, filed on Aug. 12, 1999.

(51) Int. Cl.[7] ................................................. C08K 5/09
(52) U.S. Cl. ........................................ 524/291; 524/222
(58) Field of Search ................................. 524/291, 222

(56) References Cited

U.S. PATENT DOCUMENTS

| 3,516,960 A | | 6/1970 | Martins et al. | |
|---|---|---|---|---|
| 3,575,931 A | | 4/1971 | Sherman et al. | |
| 3,617,312 A | | 11/1971 | Rose | |
| 3,951,903 A | * | 4/1976 | Shaffer | 260/37 |
| 4,024,115 A | * | 5/1977 | Zahn | 260/78 |
| 4,038,250 A | * | 7/1977 | Lind | 260/45.85 |
| 4,073,775 A | * | 2/1978 | Matsuo | 260/47 |
| 5,681,906 A | * | 10/1997 | Yezrielev | 525/450 |

FOREIGN PATENT DOCUMENTS

| EP | 0 395 237 A1 | 10/1990 |
|---|---|---|
| WO | WO95/23063 | 8/1995 |

OTHER PUBLICATIONS

Robeson, L.M.; Faucher, J.A., Secondary Loss Transitions in Antiplasticized Polymers, *Journal of Polymer Science, Part B*, 7, 35–40, 1969.

Robeson, L.M., The Effect of Antiplasticization on Secondary Loss Transitions and Permeability Polymers, *Polymer Engineering and Science*, 9, 277–281, Jul. 1969.

Maeda, Y,; Paul, D.R. Effect of Antiplasticiation on Gas Sorption and Transport. II. Poly(Phenylene Oxide), *Journal of Polymer Science, Part B*, 25, 981–1003, 1987.

International Search Report for PCT/US00/21777 (Equivalent to US 09/634,288), dated Dec. 6, 2000.

* cited by examiner

*Primary Examiner*—Paul R. Michl
(74) *Attorney, Agent, or Firm*—Charles E. Krukiel

(57) ABSTRACT

A polymer composition and method for reducing the permeability of gases through molded polymeric containers and films by incorporating into the polymer from which the container or film is formed an effective amount of a barrier-enhancing additive, such as monoesters of hydroxybenzoic acid and hydroxynaphthoic acid.

20 Claims, No Drawings

METHOD AND COMPOSITION FOR IMPROVING GAS BARRIER PROPERTIES OF POLYMERIC CONTAINERS AND FILMS

CROSS REFERENCE TO RELATED APPLICATION

This application claims priority benefit from U.S. provisional patent application No. 60/148,537 filed Aug. 12, 1999.

BACKGROUND OF THE INVENTION

The present invention is a polymer composition and method for improving the gas barrier performance of polymeric containers and films, and particularly containers for food and beverages which are molded from thermoplastic polyester polymers. More particularly, the invention is a polymer composition and method for reducing the permeability of gases through molded polymeric containers, sheets and films by incorporating into the polymer from which the container, sheet or film is formed an effective amount of a barrier-enhancing additive of the type described herein.

The addition of small amounts of molecular additives to a base polymer can result in antiplasticization of the polymer whereby the modulus of the polymer increases below its glass transition temperature and its barrier to gas permeability can improve. For example, Robeson describes the use of phenyl-2-naphthyl amine in polysulfone [Robeson, L. M.; Faucher, J. A., *J. Polym. Sci.,* Part B 7, 35–40 (1969)] and various polychlorinated aromatic molecules in polycarbonate and in polyvinyl chloride [Robeson, L. M., *Polym. Eng. Sci.* 9, 277–81 (1969)]. Maeda and Paul [Maeda, Y.; Paul, D. R., *J Polym. Sci.,* Part B: *Polym. Phys.* 25, 981–1003 (1987)] disclose the use of tricresyl phosphate in polyphenylene oxide to lower the sorption of carbon dioxide (and therefore its permeability). However, the need exists to improve the gas barrier performance of polymer resins of the type currently used for molded containers for food and beverages, and, in particular, poly(ethylene) terephthalate (PET) thermoplastic polyester polymers used for producing injection stretch blow molded bottles for packaging water, carbonated soft drinks and beer. Additives selected from 4-hydroxybenzoates and related molecules of the type described herein have not been suggested.

SUMMARY OF THE INVENTION

The present invention and the inventive features described herein reside in the discovery of certain barrier-enhancing additives for thermoplastic polymers. The invention is a polymer composition that contains one or more of the additives and a method for reducing gas permeability of shaped polymeric articles produced from such a composition, such articles being generally selected from containers, sheets and films.

The method comprises incorporating into the polymer an effective amount of a barrier-enhancing additive, or a mixture of barrier-enhancing additives, selected from the group consisting of:

(a) monoesters of hydroxybenzoic acid and hydroxynaphthoic acid of the formula (A)

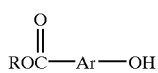

(A)

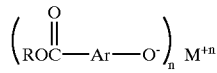

(AA)

wherein R is $C_1$–$C_8$ alkyl, benzyl, phenyl or naphthyl; Ar is substituted or unsubstituted phenylene or naphthalene; or formula (AA) where M is a cation such as, but not limited to, sodium, ammonium, tetraalkyl ammonium, potassium, calcium, magnesium or zinc;

(b) diesters of hydroxybenzoic acid of the formula (B)

(B)

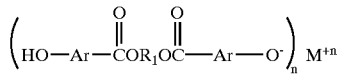

(BB)

wherein Ar is as defined above, and $R_1$ is $C_1$–$C_8$ alkyl, $(CH_2CH_2O)_kCH_2CH_2$ where k is 1 or more, benzyl, phenyl or naphthyl; or formula (BB) where M is as defined above.

(c) monoamides of hydroxybenzoic acid and hydroxynaphthoic acid of the formula (C)

(C)

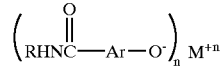

(CC)

wherein R and Ar are as defined above; or formula (CC) where M is as defined above.

(d) diamides of hydroxybenzoic acid of the formula (D)

(D)

(DD)

wherein Ar is as defined above, and $R_2$ is $C_1$–$C_8$ alkyl, $(CH_2CH_2O)_kCH_2CH_2$ where k is 1 or more, benzyl, phenyl or naphthyl; or formula (DD) where M is as defined above.

(e) ester-amides of hydroxybenzoic acid of the formula (E)

(E)

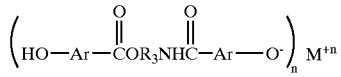

(EE)

where Ar is as defined above and $R_3$ is $C_1$–$C_8$ alkyl, $C_1$–$C_8$ dialkyl, $(CH_2CH_2O)_kCH_2CH_2$ where k is 1 or greater, benzyl, phenyl or naphthyl, or formula (EE) where M is as defined above. As used herein, an effective amount, i.e., the preferred range of barrier enhancing additive, is from 0.1% by wt. to 20% by wt. of the base polymer comprising the polymeric article.

Polymeric articles, and particularly extruded film or injection stretch blow molded polyester (e.g., PET) bottles, which contain one or more of the barrier-enhancing additives described herein, exhibit substantially reduced oxygen and carbon dioxide permeability values when measured according to ASTM D3985 and water vapor permeability values when measured according to ASTM F1249 in comparison to corresponding polymeric articles which contained no barrier-enhancing additives.

DETAILED DESCRIPTION OF THE INVENTION

The present invention resides in the discovery that oxygen, water vapor and carbon dioxide ($CO_2$) permeability values for shaped polymeric containers and films can be substantially reduced by incorporating into the base polymer from which the articles are formed from about 0.1% by wt. up to about 20% by wt. of a barrier-enhancing additive of the type defined herein.

A uniform physical blend, or mixture, is prepared comprising the base polymer and one or more barrier-enhancing additives in the desired concentrations. As used herein with reference to the invention, the term "composition" is intended to mean a physical blend or mixture. Water-sensitive base polymers, such as, for example, polyesters should preferably be thoroughly dried by heating under air or nitrogen flow or vacuum as known to those experienced in the art. The mixture is then heated and extruded or molded at a sufficiently high temperature to melt the base polymer and provide for sufficient mixing of the additive or mixture of additives within the base polymer matrix. By way of example using PET, such melt temperature ranges from about 255° C. to 300° C. The composition thus produced comprises the barrier-enhancing additive (or mixture of such additives) substantially in its (their) original molecular form; that is, only small amounts of barrier-enhancing additive have been observed to react with the base polymer via trans-esterification or other reaction mechanism typical of the functional groups present. It is preferred to prepare and extrude or mold the polymer composition under conditions of relatively low temperature and processing residence time which thereby minimizes the opportunity for the barrier-enhancing additives to react with the base polymer. Best performance in terms of desirable mechanical properties of polymeric containers and films produced according to the invention is achieved when no more than about 10% of the gas barrier-enhancing additive has reacted with the base polymer. As a consequence of any reaction of a gas barrier-enhancing additive within the scope of the invention with a base polymer, the molecular weight of the starting base polymer may decrease.

The gas barrier-enhancing additives found to be most suitable for carrying out the invention are selected from the group consisting of:

(a) monoesters of hydroxybenzoic acid and hydroxynaphthoic acid of the formula (A)

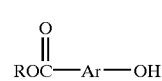

(A)

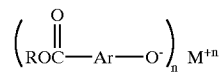

(AA)

wherein R is $C_1$–$C_8$ alkyl, benzyl, phenyl or naphthyl; Ar is substituted or unsubstituted phenylene or naphthylene; or formula (AA) where M is a cation such as, but not limited to, sodium, ammonium, tetraalkyl ammonium, potassium, calcium, magnesium or zinc;

(b) diesters of hydroxybenzoic acid of the formula (B)

(B)

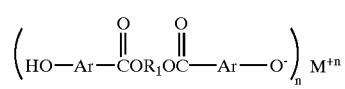

(BB)

wherein Ar is as defined above, and $R_1$ is $C_1$–$C_8$ alkyl, $(CH_2CH_2O)_kCH_2CH_2$ where k is 1 or more, benzyl, phenyl or naphthyl; or formula (BB) where M is as defined above.

(c) monoamides of hydroxybenzoic acid and hydroxynaphthoic acid of the formula (C)

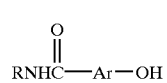

(C)

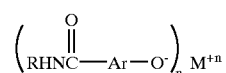

(CC)

wherein R and Ar are as defined above; or formula (CC) where M is as defined above.

(d) diamides of hydroxybenzoic acid of the formula (D)

(D)

(DD)

wherein Ar is as defined above, and $R_2$ is $C_1$–$C_8$ alkyl, $(CH_2CH_2O)_kCH_2CH_2$ where k is 1 or more, benzyl, phenyl or naphthyl; or formula (DD) where M is as defined above.

(e) ester-amides of hydroxybenzoic acid of the formula (E)

(E)

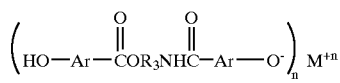

where Ar is as defined above and $R_3$ is $C_1$–$C_8$ alkyl, $C_1$–$C_8$ dialkyl, $(CH_2CH_2O)_k CH_2CH_2$, where k is 1 or greater, benzyl, phenyl or naphthyl, or formula (EE) where M is as defined above.

The above-defined barrier-enhancing additives can be obtained from commercial suppliers or they can be synthesized using established procedures.

Base polymers most suitable for use in practicing the invention comprise thermoplastic homopolymers, copolymers (both block and random), and blends of such thermoplastic polymers. Most suitable are polyester homopolymers and copolymers. Among suitable polyester base polymers are those polymers which contain structural units derived from one or more organic diacids (or their corresponding esters) selected from the group consisting of terephthalic acid, isophthalic acid, naphthalene dicarboxylic acids, hydroxybenzoic acids, hydroxynaphthoic acids, cyclohexane dicarboxylic acids, succinic acid, glutaric acid, adipic acid, sebacic acid, 1,12-dodecane dioic acid and the derivatives thereof, such as, for example, the dimethyl, diethyl, or dipropyl esters or acid chlorides of the dicarboxylic acids and one or more diols selected from ethylene glycol, 1,3-propane diol, nathphalene glycol, 1,2-propanediol, 1,2-, 1,3-, and 1,4-cyclohexane dimethanol, diethylene glycol, hydroquinone, 1,3-butane diol, 1,5-pentane diol, 1,6-hexane diol, triethylene glycol, resorcinol, and longer chain diols and polyols which are the reaction products of diols or polyols with alkylene oxides.

In a preferred embodiment of the invention the polyester base polymer is polyethylene terephthalate (PET), which includes PET polymer which has been modified with from about 2 mole % up to about 5 mole % of isophthalate units. Such modified PET is known as "bottle grade" resin and is available commercially as Melinar® Laser+polyethylene terephthalate brand resin (E. I. du Pont de Nemours and Company, Wilmington, Del.). As used hereinafter in illustrating the invention, the term PET will refer to commercially available "bottle grade" polyester resin.

Preparation of Film and Container Samples

Film samples are indicative of the improved gas barrier properties obtainable from the invention. Such film samples were generated from physical blends of a base polymer and a selected additive from among those described herein, and the samples were either compression molded or extrusion cast using a co-rotating twin screw extruder with a slit die, typically having a 0.38 mm gap, a quench roll, and a vacuum port on the front barrel section, with barrel, adapter, and die temperatures set at 240° C. to 275° C. depending on the polymer composition being used. Melt temperatures were measured with a thermocouple, and, for samples prepared using a twin screw extruder, melt temperatures were typically about 15° C. to 20° C. above the set temperature. In a few instances as noted, a transfer line, in which static mixers were installed within the line in place of a compounding screw, was used along with a slit die. Films were typically 0.05 to 0.25 mm thick. The thick films were subsequently stretched biaxially simultaneously to 3.5x by 3.5x using a Long stretcher at 90° C., 9000%/minute unless otherwise noted.

For fabricating bottles, 26 g preforms were injection molded using a Nissei ASB 50 single stage injection stretch blow molding machine with barrel temperatures set at about 265° C. and with a total cycle time of about 30 seconds. The preforms were immediately blown into 500 mL round-bottomed bottles with a blow time of 5 seconds. All other pressure, time and temperature set-points were typical for commercially available PET bottle resin.

Tensile bars ⅛" thick were molded using a 6 oz. injection molding machine with the following machine set-up: barrel temp: 255° C., mold temp: 20° C./20° C., cycle time: 20 sec/20 sec, injection pressure: 5.5 MPa, RAM speed: fast, screw speed: 60 rpm, and back pressure: 345 kPa.

Analytical Procedures

NMR Spectrometry

Samples for 1H NMR were dissolved in tetrachloroethane-d2 at 130° C. Spectra were acquired at 120° C. at 500 MHz.

Thermal Analysis

Differential Scanning Calorimetric data were acquired at 2°/min on a TA Instruments calorimeter.

Permeability

Oxygen permeability values (OPV) were measured for each sample according to ASTM procedure D3985 at 30° C., 50% RH on an Ox-Tran 1000 instrument from Modem Controls, Inc. Carbon dioxide permeability was measured at 25° C. and 0% RH on a Permatran CIV instrument, also from Modern Controls, Inc. Water vapor permeability was measured at 37–38° C., 100% RH on a Permatran-W600 instrument, also from Modem Controls, according to ASTM procedure F1249.

Intrinsic Viscosity

Intrinsic viscosity values were determined from 0.4 wt % solution of polymers or polymer blends in a 1:1 (by weight) mixture of methylene chloride and trifluoroacetic acid at 20° C.

EXAMPLES

Example 1

Films comprising commercially available PET resin (Melinar® Laser+PET brand resin) as the base polymer plus a barrier additive were prepared by a variety of methods as follows: melt pressing (M), extrusion compounding through a slit die (E), and transfer line mixing (T) into a slit die, and noted below in the table. Compositions are indicated in Table 1. After extrusion, films were simultaneously biaxially stretched to 3.5x by 3.5x at 90° C. and at a rate of 9000%/min. Oxygen permeation values (OPV) were measured according to ASTM procedure D3985 at 30° C., 50% relative humidity. Weight percent of the additive in the resin was assayed by NMR; where such analysis was not possible, nominal values (i.e., amounts initially mixed into the resin) are noted. In each case, both in unstretched and stretched films, the OPV was lower in films which contained a barrier-enhancing additive according to the invention than typical PET values (Control values, Table 1). OPV units are cc-mils/100 sq. in-24 hr-atm.

TABLE 1

| Sample | Preparation* | Additive | Wt % (NMR) | OPV: Unstretched | OPV: Stretched |
|---|---|---|---|---|---|
| Control | E | None | 0 | 11.08** | 7.23** |
| A | M | Methyl 4-hydroxybenzoate | 2.48 | 7.07 | 3.48 |

TABLE 1-continued

| Sample | Preparation* | Additive | Wt % (NMR) | OPV: Unstretched | OPV: Stretched |
|---|---|---|---|---|---|
| B | T | Methyl 4-hydroxybenzoate | 5.74 | 3.76 | 3.56 |
| C | T | Methyl 4-hydroxybenzoate | 3.49 | 7.14 | 3.69 |
| D | T | Methyl 4-hydroxybenzoate | 1.55 | 8.17 | 4.70 |
| E | T | Methyl 4-hydroxybenzoate | 0.66 | | 5.91 |
| F | E | Ethyl 4-hydroxybenzoate | 3.71 | 5.42 | 4.14 |
| G | E | n-Propyl 4-hydroxybenzoate | 2.90 | 7.91 | 4.74 |
| H | E | i-Propyl 4-hydroxybenzoate | 6.00 (nominal) | | 4.01 |
| I | M | Benzyl 4-hydroxybenzoate | 5.88 (nominal) | 8.87 | 3.99 |
| J | M | Phenyl 4-hydroxybenzoate | 5.55 (nominal) | 7.71 | 3.82 |
| K | E | Phenyl hydroxynaphthoate | 5 (nominal) | 8.49 | 4.47 |

*Preparation methods: E = extrusion compounded then extrusion through a slit die to make film; M = melt-pressed film; T = transfer line with static mixers then extrusion through a slit die to make film.
**For unstretched PET film, the control OPV is the mean of values for seven different samples, each run in duplicate; the standard deviation is 0.49. For stretched film, the control OPV is the mean of values for 27 different samples, each run in duplicate; the standard deviation is 0.41.

Example 2

Films prepared from commercially available PET resin (Melinar® Laser+brand PET resin) which contained zero or nominally 2 wt % of the sodium salt of methyl 4-hydroxybenzoate were extruded using a twin screw extruder. Oxygen permeability values were determined for both as-cast and biaxially stretched films, as in Ex. 1. Films were stretched to 3.5× by 3.5× at 9000%/min, 100° C. The OPV for the stretched film containing the additive was 5.18 cc-mils/100 sq. in-24 hr-atm stretched, versus 6.56 for stretched PET film without an additive; the additive therefore produced a 26.6% improvement in oxygen barrier performance.

Example 3

Poly(propylene terephthalate) ('3GT') films containing zero and nominally 3 wt % methyl 4-hydroxybenzoate ('MHB') were prepared using a twin screw extruder and a barrel setting of 240° C. Films containing no MHB and nominally 3 wt % MHB were stretched 3× by 3× at 55° C. and 53° C. respectively. Oxygen permeability values for the 3GT films containing MHB were 4.72 cc-mil/100 sq. in-24 hr-atm for cast film and 3.59 cc-mil/100 sq. in-24 hr-atm for stretched film, versus the 3GT control OPV values of 8.56 for as-cast film and 5.30 for stretched film. Water vapor permeability at 38° C. for as-cast films containing MHB was 2.22 g-mil/100 sq. in-24 hr and 1.95 g-mil/100 sq. in-24 hr for stretched film, versus the 3GT control values of 3.50 for as-cast film and 2.24 for stretched film.

Example 4

A blend of MHB with PET (IV 0.86) was prepared via twin-screw extrusion at 245° C. The resulting blend, which was a concentrate, had an IV of 0.86 dL/g, and contained 6.9% MHB by NMR analysis. The blend was dried overnight at 100° C. under vacuum and combined with standard commercial PET bottle resin (IV 0.83 dL/g, dried 6 hours at 150° C.). 26 g sample preforms were then injection molded using a Nissei ASB 50 single stage injection stretch blow molding machine, using barrel temperatures of about 265° C. and a total cycle time of approximately 30 seconds. The preforms were immediately blown into 500 mL round-bottomed bottles with a blow time of 5 seconds. All other pressure, time and temperature set-points were typical for standard PET bottle resin. A control set of bottles made only of the standard PET bottle resin (IV 0.83, dried 6 hours at 150° C.) was prepared under the same conditions. The oxygen permeation value for panels cut from bottles containing 1.97 wt % methyl 4-hydroxybenzoate ('MHB') was determined to be 3.69 cc-mils/100 sq. in-24 hr-atm versus 5.73 for a control PET bottle panel. Carbon dioxide permeation values were 9.65 cc-mil/100 sq. in-24 hr-atm. for the bottle with MHB and 14.62 for the control panel.

Example 5

Commercially available PET film containing 4 wt % MXD-6 6007 nylon (Mitsubishi Gas Chemical Corp.) and, nominally, 3 wt % MHB was extruded along with a PET control film. The films were biaxially stretched 3.5× by 3.5× as in Example 1. The OPV for the film containing the additives was 2.59 cc-mils/100 sq. in-24 hr-atm, versus the control film's OPV of 7.14.

Example 6

A diester of p-hydroxybenzoic acid ('HBA') (corresponding to Formula B where $R_1=CH_2CH_2$) was synthesized from the reaction of stoichiometric mixtures of HBA and ethylene glycol in diphenyl ether with the catalyst butyl stannoic acid. PET films containing 0 and 4.55 wt % of this diester were extruded and then stretched as in Example 1. The OPV of the film containing the diester was 3.93 cc-mils/100 sq. in-24 hr-atm, and the OPV of the PET film without the diester was 7.32 cc-mils/100 sq. in-24 hr-atm.

Example 7

The benzamide of HBA (corresponding to Formula C where R=phenyl) was synthesized from the reaction of MHB with benzylamine. An extruded PET film containing a nominal 3 wt % of this benzamide and stretched as in Example 1 exhibited an OPV of 5.00 cc-mil/100 sq. in-24 hr-atm, vs. a PET control film which had an OPV of 6.94.

Example 8

The diamide of HBA (corresponding to Formula D where $R_1=CH_2CH_2$) was synthesized from the reaction of 4-acetoxybenzoyl chloride with ethylene diamine, followed by basic hydrolysis of the acetate groups. An extruded PET film containing a nominal 3 wt % of this diamide and stretched as in Example 1 exhibited an OPV of 5.46 cc-mil/100 sq. in-24 hr-atm whereas a PET control film exhibited an OPV of 7.79.

Example 9

A diester of HBA and triethylene glycol was synthesized from the reaction of stoichiometric mixtures of HBA and triethylene glycol in diphenyl ether with the catalyst butyl stannoic acid. PET film containing 6.49 wt % of this diester (determined by NMR) was extruded and stretched as in Example 1. The OPV for this film was 4.0 cc-mil/100 sq. in-24 hr-atm whereas a PET control film exhibited an OPV of 7.04.

Example 10

A blend of 97 wt % dried PET resin (Melinar® Laser+ brand PET resin) and 3 wt % methyl 4-hydroxybenzoate was mixed thoroughly and added to the hopper of a 6 oz. injection molding machine. Standard ⅛" thick tensile bars were molded with the following machine set-up: barrel temp 255° C., mold temp: 20° C./20° C., cycle time: 20 sec/20 sec, injection pressure: 5.5 MPa, RAM speed: FAST, screw speed: 60 rpm, and back pressure: 345 kPa. Intrinsic viscosity was measured on sections which were cut from the center of the bars using a 0.4% solution in 1:1 TFA: $CH_2Cl_2$ at 19° C. The I.V. was 0.73 dL/g vs. a control PET resin sample molded under identical conditions which had an I.V. of 0.73 dL/g.

In contrast, the I.V. of the bottle from Example 4, containing 1.97 wt % MHB and prepared from a precompounded MHB/PET concentrate, was 0.464 dL/g, and the control PET bottle I.V. was 0.76 dL/g. This example demonstrates that degradation of the polymer composition's molecular weight (as evidenced by I.V.) can be avoided by selection of appropriate processing conditions.

Example 11

Laser+PET films containing 0 to 3.46 wt % MHB were prepared by extrusion compounding. Two of these were also biaxially stretched as in Example 1. Water vapor permeabilities (g-mil/100 sq. in-24 hr) at 38° C., 100% relative humidity are tabulated below.

| MHB Content (wt %) | Water Vapor Permeability, As-Cast Film | Water Vapor Permeability, Stretched Film |
|---|---|---|
| 0 | 4.31 | 2.43 |
| 0.56 | 3.87 | — |
| 1.91 | 3.42 | 1.69 |
| 3.46 | 2.93 | — |

Example 12

Films of Lexan® 134r polycarbonate, Ultem® 1000 polyetherimide (both manufactured by General Electric), and Radel® polyethersulfone (manufactured by Boedeker Plastics, Inc.) containing 0 or nominally 5 wt % n-propyl p-hydroxybenzoate (PHB) were melt-pressed at 260, 270, and 270° C., respectively. Oxygen permeabilities (OPV) at 30° C. are tabulated below.

| Polymer | OPV, no PHB (cc-mil/100 sq. in. 24 hr) | OPV, nom.5 wt % PHB (cc-mil/100 sq. in. 24 hr) |
|---|---|---|
| Lexan ® 134r polycarbonate | 232.5 | 138.7 |
| Ultem ® 1000 polyetherimide | 48.05 | 24.45 |
| Radel ® polyethersulfone | 89.79 | 52.11 |

Example 13

Films of a copolymer of composition 7.4% poly (isosorbide terephthalate)-co-92.6% poly(ethylene terephthalate), prepared according to U.S. Pat. No. 5,959, 066, containing 0 to 3.85 wt % MHB were prepared by extrusion compounding, then biaxially stretched 3.5× by 3.5× at 90° C. (95° C. for 0% MHB), 9000%/min. Oxygen permeabilities are tabulated below.

| MHB Wt % | OPV (cc-mil/100 sq. in/24 hr-atm) |
|---|---|
| 0 | 8.22 |
| 0.70 | 8.02 |
| 2.24 | 5.57 |
| 3.85 | 3.98 |

What is claimed is:

1. A method for reducing gas permeability of shaped thermoplastic polymeric articles wherein the polymer from which the article is formed is selected from the group consisting of polyesters, polycarbonates, polyetherimides and polyethersulfones and wherein the method comprises the steps of: (1) incorporating into the polymer an amount of a barrier-enhancing additive or a mixture of barrier-enhancing additives effective to reduce gas permeability and selected from the group consisting of:

(a) monoesters of hydroxybenzoic acid and hydroxynaphthoic acid of the formula (A)

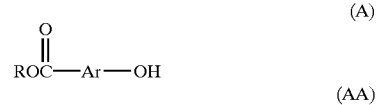

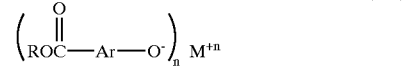

wherein R is $C_1$–$C_4$ alkyl, benzyl, phenyl or naphthyl; Ar is substituted or unsubstituted phenylene or naphthylene; or formula (AA) where M is a cation such as, but not limited to, sodium, ammonium, tetraalkyl ammonium, potassium, calcium, magnesium or zinc;

(b) diesters of hydroxybenzoic acid of the formula (B)

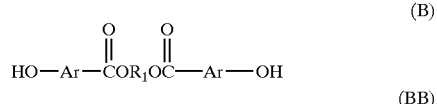

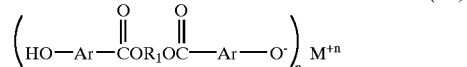

wherein Ar is as defined above, and $R_1$ is $C_1$–$C_4$ alkyl, $(CH_2CH_2O)_kCH_2CH_2$ where k is 1 or more, benzyl, phenyl or naphthyl; or formula (BB) where M is as defined above;

(c) monoamides of hydroxybenzoic acid and hydroxynaphthoic acid of the formula (C)

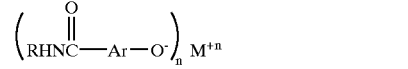

wherein R and Ar are as defined above; or formula (CC) where M is as defined above;

(d) diamides of hydroxybenzoic acid of the formula (D)

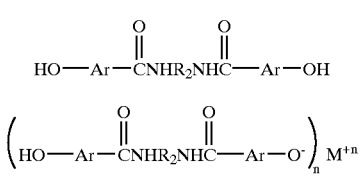

wherein Ar is as defined above, and $R_2$ is $C_1$–$C_4$ alkyl $(CH_2CH_2O)_kCH_2CH_2$ where k is 1 or more, benzyl, phenyl or naphthyl; or formula (DD) where M is as defined above; and (e) ester-amides of hydroxybenzoic acid of the formula (E)

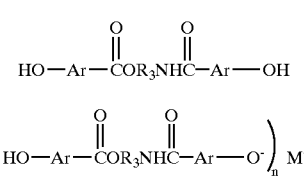

where Ar is as defined above and $R_3$ is $C_1$–$C_4$ alkyl, $C_1$–$C_8$ dialkyl, $(CH_2CH_2O)_kCH_2CH_2$ where k is 1 or greater, benzyl, phenyl or naphthyl, or formula (EE) where M is as defined above by first forming a physical mixture comprising the polymer and one or more of the gas barrier enhancing additives, (2) heating the mixture to a temperature sufficiently high to melt the polymer but low enough to maintain the one or more gas barrier enhancing additives substantially in its or their original molecular form, and (3) forming the article.

2. The method of claim 1 wherein the thermoplastic polymer is selected from thermoplastic homopolymers, random or block copolymers or a blend or blends of such homopolymers and copolymers.

3. The method of claim 2 wherein the thermoplastic homopolymer or random or block copolymer is a polyester homopolymer or copolymer.

4. A thermoplastic polymer composition comprising (1) a base polymer which is selected from the group consisting of polyesters, polycarbonates, polyetherimides and polyethersulfones, including their homopolymers, random or block copolymers and a blend or blends of such homopolymers and copolymers and (2) an amount of one or more gas barrier-enhancing molecular additives, or a mixture of such gas barrier-enhancing molecular additives, effective to reduce the gas permeability of the base polymer and selected from the group consisting of:

(a) monoamides of hydroxybenzoic acid and hydroxynaphthoic acid of the formula (C)

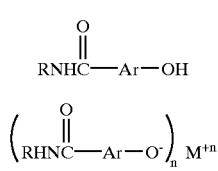

wherein R and Ar are as defined above; or formula (CC) where M is as defined above;

(b) diamides of hydroxybenzoic acid of the formula (D)

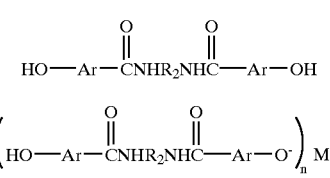

wherein Ar is as defined above, and $R_2$ is $C_1$–$C_4$ alkyl, $(CH_2CH_2O)_kCH_2CH_2$ where k is 1 or more, benzyl, phenyl or naphthyl; or formula (DD) where M is as defined above; and (c) ester-amides of hydroxybenzoic acid of the formula (E)

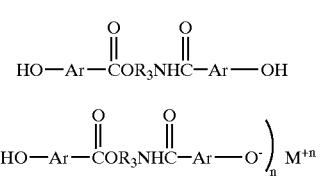

where Ar is as defined above and $R_3$ is $C_1$–$C_4$ alkyl, $C_1$–$C_8$ dialkyl, $(CH_2CH_2O)_kCH_2CH_2$ where k is 1 or greater, benzyl, phenyl or naphthyl, or formula (EE) where M is as defined above.

5. The polymer composition of claim 4 in which the base polymer is a polyester homopolymer or copolymer which contains structural units derived from one or more organic diacids or their corresponding esters selected from the group consisting of terephthalic acid, isophthalic acid, naphthalene dicarboxylic acids, hydroxybenzoic acids, hydroxynaphthoic acids, cyclohexane dicarboxylic acids, succinic acid, glutaric acid, adipic acid, sebacic acid, 1,12-dodecane dioic acid and the derivatives thereof which are the dimethyl, diethyl, or dipropyl esters or acid chlorides of the dicarboxylic acids and one or more diols selected from the group consisting of ethylene glycol, 1,3-propane diol, nathphalene glycol, 1,2-propanediol, 1,2-, 1,3-, and 1,4-cyclohexane dimethanol, diethylene glycol, hydroquinone, 1,3-butane diol, 1,5-pentane diol, 1,6-hexane diol, triethylene glycol, resorcinol, and long chain diols and polyols which are the reaction products of diols or polyols with alkylene oxides, and the gas barrier-enhancing molecular additive or mixture of such gas barrier-enhancing molecular additives are present in the polymer composition at a total concentration of from 0.1% by wt. up to about 20% by wt of the composition.

6. The polymer composition of claim 4 in which the polyester homopolymer copolymer is polyethylene terephthalate.

7. An article of manufacture which is a sheet, a film or a container which is formed from the composition of claim 4.

8. A thermoplastic polymer composition comprising:
(1) a base polymer which is a polyester homopolymer or copolymer which contains structural units derived from one or more organic diacids or their corresponding esters selected from the group consisting of terephthalic acid, isophthalic acid, naphthalene dicarboxylic acids, hydroxybenzoic acids, hydroxynaphthoic acids, cyclohexane dicarboxylic acids, succinic acid, glutaric acid, adipic acid, sebacic acid, 1,12-dodecane dioic acid and the derivatives thereof which are the dimethyl, diethyl, or dipropyl esters or acid chlorides of the dicarboxylic acids and one or more diols selected from the group consisting of ethylene glycol, 1,3-propane diol, naphthalene glycol, 1,2-propanediol, 1,2-, 1,3-, and 1,4-cyclohexane dimethanol, diethylene glycol, hydroquinone, 1,3-butane diol, 1,5-pentane diol, 1,6-hexane diol, triethylene glycol, resorcinol, and long chain diols and polyols which are the reaction products of diols or polyols with alkylene oxides, and the gas barrier-enhancing molecular additive or mixture of such gas barrier-enhancing molecular additives are present in the polymer composition at a total concentration of from 0.1% by wt. up to about 20% by wt. of the composition; and (2) an amount of a gas barrier-enhancing molecular additive or mixture of such gas barrier-enhancing molecular additives effective to reduce gas permeability of the base polymer and selected from the group consisting of:

(a) monoesters of hydroxybenzoic acid and hydroxynaphthoic acid of the formula (A)

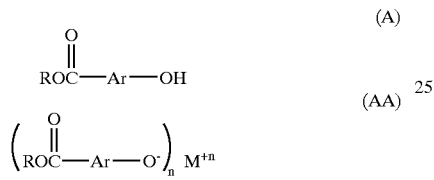

wherein R is $C_1$–$C_4$ alkyl, benzyl, phenyl or naphthyl; Ar is substituted or unsubstituted phenylene or naphthylene; or formula (AA) where M is a cation such as, but not limited to, sodium, ammonium, tetraalkyl ammonium, potassium, calcium, magnesium or zinc; and (b) diesters of hydroxybenzoic acid of the formula (B)

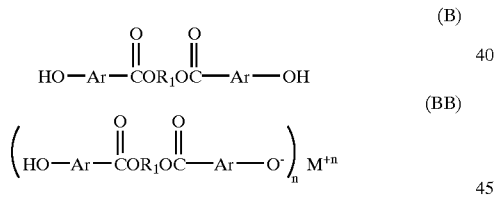

wherein Ar is as defined above, and $R_1$ is $C_1$–$C_4$ alkyl, $(CH_2CH_2O)_kCH_2CH_2$ where k is 1 or more, benzyl, phenyl or naphthyl; or formula (BB) where M is as defined above.

9. The polymer composition of claim 8 in which the polyester homopolymer or copolymer is polyethylene terephthalate.

10. The method of claim 1 wherein the article is selected from the group consisting of containers, sheets and films and wherein no more than about 10% of the one or more barrier-enhancing additives reacts with the polymer.

11. A shaped thermoplastic polymeric article comprising a base polymer having physically incorporated therein an amount of one or more barrier-enhancing additives effective to reduce permeability of the shaped article to gases when compared to the shaped article not having the one or more barrier-enhancing additives incorporated therein, wherein the one or more barrier-enhancing additives are selected from the group consisting of:

(a) monoesters of hydroxybenzoic acid and hydroxynaphthoic acid of the formula (A)

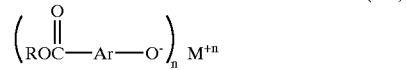

wherein R is $C_1$–$C_4$ alkyl, benzyl, phenyl or naphthyl; Ar is substituted or unsubstituted phenylene or naphthylene; or formula (AA) where M is a cation such as, but not limited to, sodium, ammonium, tetraalkyl ammonium, potassium, calcium, magnesium or zinc;

(b) diesters of hydroxybenzoic acid of the formula (B)

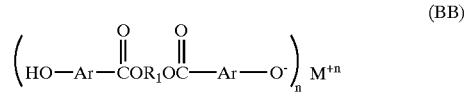

wherein Ar is as defined above, and $R_1$ is $C_1$–$C_4$ alkyl, $(CH_2CH_2O)_kCH_2CH_2$ where k is 1 or more, benzyl, phenyl or naphthyl; or formula (BB) where M is as defined above;

(c) monoamides of hydroxybenzoic acid and hydroxynaphthoic acid of the formula (C)

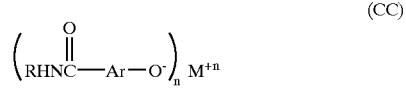

wherein R and Ar are as defined above; or formula (CC) where M is as defined above;

(d) diamides of hydroxybenzoic acid of the formula (D)

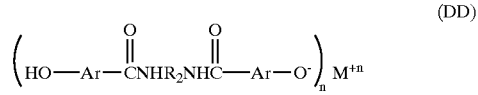

wherein Ar is as defined above, and $R_2$ is $C_1$–$C_4$ alkyl, $(CH_2CH_2O)_kCH_2CH_2$ where k is 1 or more, benzyl, phenyl or naphthyl; or formula (DD) where M is as defined above; and (e) ester-amides of hydroxybenzoic acid of the formula (E)

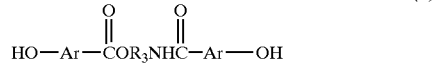

-continued

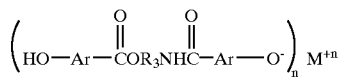
(EE)

where Ar is as defined above and $R_3$ is $C_1$–$C_4$ alkyl, $C_1$–$C_8$ dialkyl, $(CH_2CH_2O)_kCH_2CH_2$ where k is 1 or greater, benzyl, phenyl or naphthyl, or formula (EE) where M is as defined above.

12. The shaped thermoplastic polymeric article of claim 11 wherein the thermoplastic base polymer is selected from the group consisting of polyesters, polycarbonates, polyetherimides and polyethersulfones and the one or more barrier-enhancing additives are incorporated therein by (i) forming a physical mixture comprising the base polymer and one or more of the gas barrier-enhancing additives, (ii) heating the mixture to a temperature sufficiently high to melt the base polymer but low enough to maintain the one or more barrier-enhancing additives substantially in its or their original molecular form, and (iii) forming the article.

13. The shaped thermoplastic polymeric article of claim 12 wherein no more than about 10% of the one or more barrier-enhancing additives reacts with the base polymer.

14. The shaped thermoplastic polymeric article of claim 13 which is a molded bottle wherein the base polymer is a polyester homopolymer or copolymer.

15. The molded bottle of claim 14 wherein the polyester homopolymer or copolymer comprises polyethylene terephthalate.

16. A blow molded thermoplastic polymeric bottle comprising a base polymer having incorporated therein an amount of one or more barrier-enhancing additives that is effective to reduce permeability of the molded bottle to oxygen and carbon dioxide gases when compared to a molded thermoplastic polymeric bottle not having the one or more barrier-enhancing additives incorporated therein, wherein the one or more barrier-enhancing additives are selected from the group consisting of:

(a) monoesters of hydroxybenzoic acid and hydroxynaphthoic acid of the formula (A)

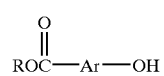
(A)

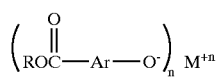
(AA)

wherein R is $C_1$–$C_4$ alkyl, benzyl, phenyl or naphthyl; Ar is substituted or unsubstituted phenylene or naphthylene; or formula (AA) where M is a cation such as, but not limited to, sodium, ammonium, tetraalkyl ammonium, potassium, calcium, magnesium or zinc;

(b) diesters of hydroxybenzoic acid of the formula (B)

(B)

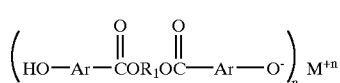
(BB)

wherein Ar is as defined above, and $R_1$ is $C_1$–$C_4$ alkyl, $(CH_2CH_2O)_kCH_2CH_2$ where k is 1 or more, benzyl, phenyl or naphthyl; or formula (BB) where M is as defined above;

(c) monoamides of hydroxybenzoic acid and hydroxynaphthoic acid of the formula (C)

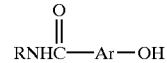
(C)

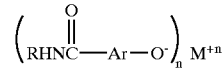
(CC)

wherein R and Ar are as defined above; or formula (CC) where M is as defined above;

(d) diamides of hydroxybenzoic acid of the formula (D)

(D)

(DD)

wherein Ar is as defined above, and $R_2$ is $C_1$–$C_4$ alkyl, $(CH_2CH_2O)_kCH_2CH_2$ where k is 1 or more, benzyl, phenyl or naphthyl; or formula (DD) where M is as defined above; and (e) ester-amides of hydroxybenzoic acid of the formula (E)

(E)

(EE)

where Ar is as defined above and $R_3$ is $C_1$–$C_4$ alkyl, $C_1$–$C_8$ dialkyl, $(CH_2CH_2O)_kCH_2CH_2$ where k is 1 or greater, benzyl, phenyl or naphthyl, or formula (EE) where M is as defined above.

17. The blow molded thermoplastic polymeric bottle of claim 16 wherein the base polymer is selected from polyester homopolymers, random or block polyester copolymers and a blend or blends of such homopolymers and copolymers.

18. The blow molded thermoplastic polymeric bottle of claim 17 wherein the base polymer is bottle grade polyethylene terephthalate that has been modified with from about 2 mole % up to about 5 mole % of isophthalate units, and the barrier-enhancing additive is a monoester of hydroxybenzoic acid at a concentration of from about 0.01% by wt. to 6.0% by wt.

19. A method for producing a blow molded thermoplastic polymeric bottle comprising a base polymer selected from polyester homopolymers and copolymers having incorporated therein an amount of one or more barrier-enhancing additives that is effective to reduce permeability of the molded thermoplastic polymeric bottle to oxygen and carbon dioxide gases when compared to a molded thermoplastic polymeric bottle not having the one or more barrier-enhancing additives incorporated therein, wherein the one or more barrier-enhancing additives are selected from the group consisting of:

(a) monoesters of hydroxybenzoic acid and hydroxynaphthoic acid of the formula (A)

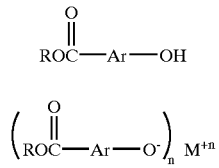

(A)

(AA)

wherein R is $C_1$–$C_4$ alkyl, benzyl, phenyl or naphthyl; Ar is substituted or unsubstituted phenylene or naphthylene; or formula (AA) where M is a cation such as, but not limited to, sodium, ammonium, tetraalkyl ammonium, potassium, calcium, magnesium or zinc;

(b) diesters of hydroxybenzoic acid of the formula (B)

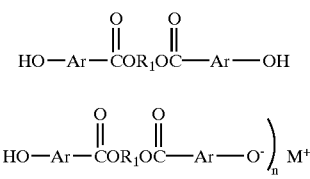

(B)

(BB)

wherein Ar is as defined above, and $R_1$ is $C_1$–$C_4$ alkyl, $(CH_2CH_2O)_kCH_2CH_2$ where k is 1 or more, benzyl, phenyl or naphthyl; or formula (BB) where M is as defined above;

(c) monoamides of hydroxybenzoic acid and hydroxynaphthoic acid of the formula (C)

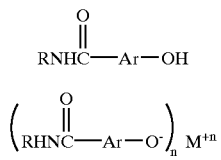

(C)

(CC)

wherein R and Ar are as defined above; or formula (CC) where M is as defined above;

(d) diamides of hydroxybenzoic acid of the formula (D)

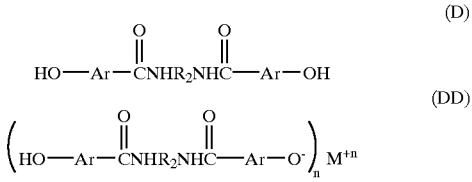

(D)

(DD)

wherein Ar is as defined above; and $R_2$ is $C_1$–$C_4$ alkyl, $(CH_2CH_2O)_kCH_2CH_2$ where k is 1 or more, benzyl, phenyl or naphthyl; or formula (DD) where M is as defined above; and (e) ester-amides of hydroxybenzoic acid of the formula (E)

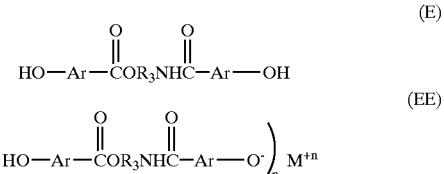

(E)

(EE)

where Ar is as defined above and $R_3$ is $C_1$–$C_4$ alkyl, $C_1$–$C_8$ dialkyl, $(CH_2CH_2O)_kCH_2CH_2$ where k is 1 or greater, benzyl, phenyl or naphthyl, or formula (EE) where M is as defined above, said method comprising the steps of:
(i) forming a physical mixture comprising the base polymer and one or more of the gas barrier-enhancing additives;
(ii) heating and melt blending the mixture to a temperature sufficiently high to melt the base polymer but low enough to maintain the one or more barrier-enhancing additives substantially in its or their original molecular form; and
(iii) injection blow molding the bottle.

20. The method of claim 19 wherein the the base polymer is bottle grade polyethylene terephthalate that has been modified with from about 2 mole % up to about 5 mole % of isophthalate units, and the barrier-enhancing additive is a monoester of hydroxybenzoic acid at a concentration of from about 0.01% by wt. to 6.0% by wt of the composition.

* * * * *